United States Patent
Li et al.

(10) Patent No.: US 10,782,095 B2
(45) Date of Patent: *Sep. 22, 2020

(54) AUTOMATIC TARGET POINT TRACING METHOD FOR ELECTRO-OPTICAL SIGHTING SYSTEM

(71) Applicant: Huntercraft Limited, Albany, NY (US)

(72) Inventors: Danyang Li, Albany, NY (US); Ming Chen, Albany, NY (US); Yayun Gong, Albany, NY (US)

(73) Assignee: HUNTERCRAFT LIMITED, Albany, NY (US)

( * ) Notice: Subject to any disclaimer, the term of this patent is extended or adjusted under 35 U.S.C. 154(b) by 404 days.

This patent is subject to a terminal disclaimer.

(21) Appl. No.: 15/821,944

(22) Filed: Nov. 24, 2017

(65) Prior Publication Data

US 2019/0162507 A1   May 30, 2019

(51) Int. Cl.

| | |
|---|---|
| *F41G 1/34* | (2006.01) |
| *G06T 11/00* | (2006.01) |
| *G06K 9/46* | (2006.01) |
| *G06T 7/246* | (2017.01) |
| *G06K 9/62* | (2006.01) |
| *G06T 7/11* | (2017.01) |
| *F41G 3/08* | (2006.01) |

(52) U.S. Cl.
CPC .......... *F41G 1/345* (2013.01); *G06K 9/4642* (2013.01); *G06K 9/6256* (2013.01); *G06K 9/6267* (2013.01); *G06T 7/11* (2017.01); *G06T 7/248* (2017.01); *G06T 11/001* (2013.01); *F41G 3/08* (2013.01); *G06T 2207/10024* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 8,908,045 | B2 * | 12/2014 | Stewart | H04N 5/225 348/169 |
| 10,378,857 | B2 * | 8/2019 | Li | G06T 7/80 |
| 2008/0163536 | A1 * | 7/2008 | Koch | F41A 17/066 42/111 |
| 2012/0097741 | A1 * | 4/2012 | Karcher | F41G 1/38 235/404 |
| 2017/0091171 | A1 * | 3/2017 | Perez | G06F 40/35 |
| 2019/0162507 | A1 * | 5/2019 | Li | F41G 1/345 |

* cited by examiner

*Primary Examiner* — Tahmina N Ansari
(74) *Attorney, Agent, or Firm* — Novick, Kim & Lee, PLLC; Allen Xue

(57) ABSTRACT

An automatic target point tracing method, marking a target object in an image acquired by the sighting system to obtain a target point, performing feature extraction and feature description on the image with the target point, and establishing a ridge regression classifier and performing learning training on the classifier according to the extracted features; calculating a regression score of the features of the real-time acquired image in the trained ridge regression classifier, determining that the target point is automatically recognized when the regression score reaches a requirement, and displaying an orientation of the target point in a display unit area; and determining that the target object disappears when the regress core does not reach the requirement, and performing searching near a position where the target object disappears.

8 Claims, 4 Drawing Sheets

US 10,782,095 B2

AUTOMATIC TARGET POINT TRACING METHOD FOR ELECTRO-OPTICAL SIGHTING SYSTEM

TECHNICAL FIELD

The present invention mainly belongs to the field of sighting, particularly to an automatic target point tracing method for an electro-optical sighting system.

BACKGROUND

Sights in the prior art includes a mechanical sight and an optical sight, and the mechanical sight mechanically realizes sighting by a metal sight, such as a ruler, a sight bead, and a peep sight; and the optical sight realizes sighting by overlapping a target image and a sighting line on the same focusing plane by using optical lens imaging. The existing sight has the following shortcomings and inconveniences: (1) after the sight is mounted, when the sight is applied to sighting shooting, it is ensured that accurate shooting may be completed by an accurate sighting gesture in combination with a long-term shooting experience, however, for a shooting beginner, his or her shooting accuracy will be influenced by an incorrect sighting gesture and a poor shooting experience; (2) in a shooting process, there is a need for adjusting, calibrating and segmenting points of impact for multiple times; and (3) during shooting, there is a need for crossly segmenting and sighting a target object, when the target object is manually jittered or moves, it is necessary to find the target object again, and in most causes, a direction where the target is located at this time may not be radically known, and since a field of view of the sight is smaller, the target is extremely difficultly found, which brings the great inconvenience to shooting.

SUMMARY

In view of the above-mentioned problems, the present invention provides an integrated accurate electro-optical sighting system for automatically tracing a target point as well as an automatic target point tracing method for the electro-optical sighting system from a perspective of a sighting system of a gun and in combination with academic research in terms of image processing.

The present invention is achieved by the following technical solution.

An automatic target point tracing method, which is applied to an electro-optical sighting system, wherein the electro-optical sighting system sights a target object to acquire an optical image of the target object, characterized in that the automatic target point tracing method comprises the following steps: marking a target point and tracing a position of the target point, wherein marking the target point is to mark the target object in an image of a first frame, which is acquired by the electro-optical sighting system, to obtain the target point; tracing a position of the target point is to trace the position of the target point in an image of a frame following a second frame, which is acquired by the electro-optical sighting system, wherein tracing the position of the target point comprises two steps of tracing the target point within a field of view and re-detecting the target point; tracing the target point within the field of view is used to trace the target point in a field of view unit; and re-detecting the target point is used to re-detect and retrieve the target point which is not in the field of view unit.

Further, wherein the marking the target point comprises: after a target point marking command is started, performing matrix analysis on data of the image of the first image, which is acquired by the electro-optical sighting system; retrieving a corresponding pixel area in an image matrix according to a coordinate position of a center of crossed segmenting lines of the electro-optical sighting system; and changing a color value of this area.

Further, wherein the tracing the target point within the field of view comprises: performing feature extraction and feature description on the image with the target point; and establishing a ridge regression classifier and performing learning training on the classifier according to the extracted feature; and
calculating a regression score of the features of the real-time acquired image in the trained ridge regression classifier, determining that the target point is automatically recognized when the regression score reaches a requirement, and displaying an orientation of the target point in a display unit area.

Further, wherein the re-detecting the target point comprises: determining that the target object disappears when the regress core does not reach the requirement; and performing searching near a position where the target object disappears by using a sliding window method with the position where the target object disappears as a reference point, and determining that the target object returns to a field of view or not by performing regression score calculation until the regression score reaches the requirement.

Further, wherein feature extraction and feature description are performed on the image with the target point by employing a fast hog feature point detection method, and the fast hog feature point detection method particularly comprises: calculating gradient values of each pixel point in an image in an x direction and a y direction, and calculating a gradient direction of each pixel point, calculating gradient magnitudes on three channels of R, G and B of the image, respectively, segmenting the image into n units with every 4*4 pixels as a unit by taking the gradient direction on the channel with maximum gradient magnitude in combination with unsigned gradients and signed gradients, counting directions of the signed gradients and the unsigned gradients within each 4*4 unit to obtain a gradient direction histogram D of this unit; normalizing the histogram to obtain a feature expression of each unit, wherein n is a positive integer.

Further, wherein the automatic target point tracing method performs feature extraction and feature description on the image with the target point by employing a color-naming feature point detection method;
the color-naming feature point detection method comprises: converting a RGB space of the image into a color attribute space, wherein the color attribute space is a 11-dimensional color representation, the color-naming feature point detection method and the fast hog feature point detection method have no any intersection, and are complemented each other; and
the automatic target point tracing method effectively fuses feature points extracted by the fast hog feature point detection method and feature points extracted by the color-naming feature point detection method to improve the tracing performance.

Further, wherein the establishing a ridge regression classifier and the performing learning training on the classifier according to the extracted feature comprise: constructing a training sample of the classifier from the extracted features by cyclic shifting so that a data matrix becomes a cyclic matrix; then transforming to a Fourier domain based on a property of the cyclic matrix to obtain a basic sample, wherein a label size of the basic sample obeys the Gaussian distribution; and training the ridge regression classifier by using the training sample to obtain a model parameter of the regression classifier.

Further, wherein the learning training particularly comprises: constructing the cyclic matrix as the training sample by using features, wherein the cyclic matrix is as follows:

$$X = C(x) = \begin{bmatrix} X_1 & X_2 & X_3 & \cdots & X_n \\ X_n & X_1 & X_2 & \cdots & X_{n-1} \\ X_{n-1} & X_n & X_1 & \cdots & X_{n-2} \\ \vdots & \vdots & \vdots & \ddots & \vdots \\ X_2 & X_3 & X_4 & \cdots & X_1 \end{bmatrix};$$

wherein $x_i$ represents an extracted feature value, $i \in (1,n)$;
performing discrete Fourier transform on the cyclic matrix, and diagonalizing in a Fourier space to obtain $X = F \text{diag}(\hat{x}) F^H$, wherein F represents a discrete Fourier matrix and is a constant;
$\hat{x} = \mathcal{F}(x)$ represents a diagonal matrix subjected to the discrete Fourier transform; and
training a ridge regression classifier by using the diagonalized sample to obtain a model parameter of the regression classifier.

Further, wherein the calculating a regression score of the features of the real-time acquired image in the trained ridge regression classifier particularly comprises:

$$\hat{f}(z) = \hat{k}^{xz} \odot \hat{\alpha}; \hat{\alpha} = \left(\frac{1}{\hat{k}^{xx} + \lambda}\right)^* \odot \hat{y};$$

(x, y) represents a training set of the ridge regression classifier;
wherein $k^{xx}$ represents a first row of a kernel correlation matrix, $\lambda$ represents a regular term coefficient of preventing model fitting from overflowing;
Z represents a feature sample of the real-time acquired image, $k^{xz}$ represents a kernel correlation of a sample Z after being shifted on the basis of a sample X, and $\odot$ is a centered dot symbol representing a multiplication of multiple elements.

Further, wherein a case where the regression score reaches a requirement means that the regression score meets the following requirements:

$$F_{max} > \text{threshold\_1}; d > \text{threshold\_2}$$

$$\text{wherein } F_{max} = \max F_{(s,w)}; d = \frac{|F_{max} - F_{min}|}{\text{mean}\left(\sum_{(w,h)}(F_{w,h} - F_{min})^2\right)};$$

$F_{max}$ represents the highest score of all the samples in a current search area, $F_{min}$ represents the lowest score of all the samples in the current search area, $F_{w,h}$ represents scores of samples numbered as w and h, mean represents averaging a numerical value within brackets, w represents a trained model, s represents a sample sampled near a target; threshold_1 and threshold_2 represent judgment thresholds.

Further, wherein the electro-optical sighting system comprises a housing, wherein the housing is an accommodating space, an interior portion of the accommodating space comprises a field of view acquisition unit, a video processing unit, a display unit, a power supply and a sighting circuit unit; and the electro-optical sighting system has an automatic target point tracing module, wherein the automatic target point tracing module is configured to automatically trace a target object by employing the automatic target point tracing method.

Further, wherein the electro-optical sighting system comprises an anti-jitter processing unit, wherein the anti-jitter processing unit performs anti-jitter processing on an image acquired by the electro-optical sighting system and then the image subjected to the anti-jitter processing is displayed at the display unit.

The present invention has advantageous effects that the present invention provides an automatic target point tracing method which may realize automatic tracing of a target object, and the automatic target point tracing method may be applied to the electro-optical sighting system, so that rapid sighting may be realized, and the sighting speed and the sighting accuracy are remarkably improved.

wherein 1. field of view acquisition unit; 2. display unit; 3. battery compartment; 4. rotary encoder; 5. focusing knob; 6. external leather track; 7. key control board; 8. Picatinny; 9. electro-optical conversion board; 10. sighting circuit processing unit; 11. display conversion board; 81. adjustable fastening nut 1; 82. adjustable fastening nut II; 101. CPU core board; and 102. interface board 102.

DETAILED DESCRIPTION OF EMBODIMENT

Objectives, technical solutions and advantages of the present invention will become more apparent from the following detailed description of the present invention when taken in conjunction with accompanying drawings. It should be understood that specific embodiments described herein are merely illustrative of the present invention and are not intended to limit the present invention.

Rather, the present invention encompasses any alternatives, modifications, equivalents, and solutions made within the spirit and scope of the present invention as defined by the claims. Further, in order to give the public a better understanding of the present invention, some specific details are described below in detail in the following detailed description of the present invention. It will be appreciated by those skilled in the art that the present invention may be understood without reference to the details.

Embodiment 1

The present invention provides an electro-optical sighting system for automatically tracing a target point. The sighting system has an automatic tracing module, wherein the automatic tracing module is configured to perform real-time automatic tracing on a target object by employing an automatic tracing method.

Figure 5:
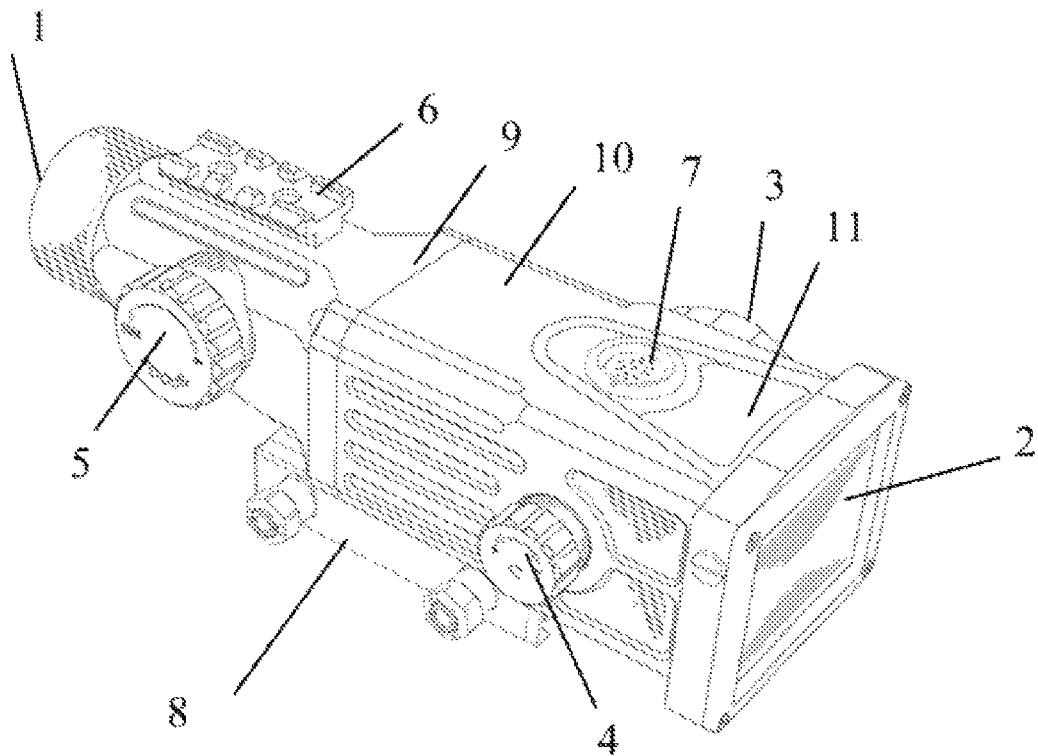
FIG. 5 is a perspective view showing a sighting telescope in an embodiment 1 according to the present invention.
Figure 6:
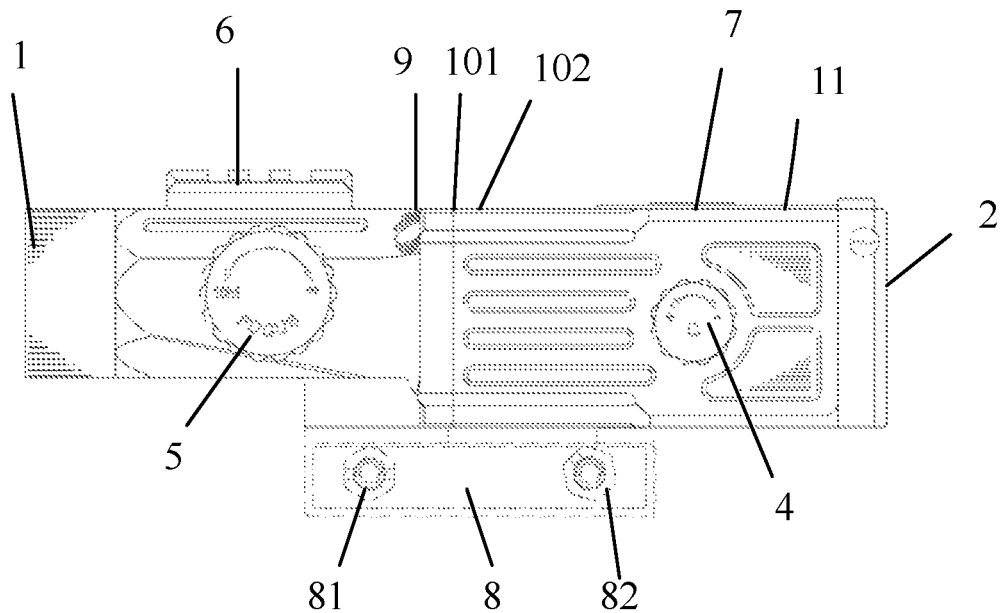
FIG. 6 is a left view showing a sighting telescope in an embodiment 1 according to the present invention.
Figure 7:
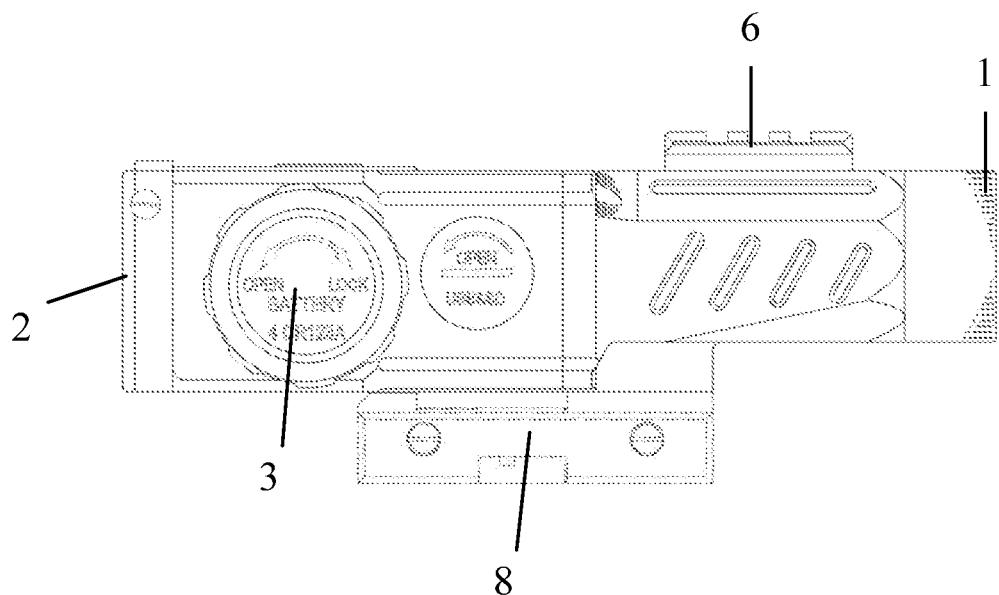
FIG. 7 is a right view showing a sighting telescope in an embodiment 1 according to the present invention.

The sighting system may be conveniently mounted on various types of firearms. The electro-optical sighting system includes a housing, wherein the housing is of a detachable structure as a whole, an internal portion of the housing is an accommodating space, the accommodating space includes a field of view acquisition unit, a video processing unit, a display unit, a power supply and a sighting circuit unit, as shown in FIG. 5 to FIG. 7.

The field of view acquisition unit 1 includes an objective lens combination or other optical visual device, and the objective lens combination or the optical visual device is mounted on the front end of the field of view acquisition unit 1 to acquire field of view information.

The electro-optical sighting system is a digitallizer as a whole, which may communicate with a smart phone, an intelligent terminal, a sighting apparatus or a circuit and sends video information acquired by the field of view acquisition unit 1 to the smart phone, the intelligent terminal, the sighting apparatus or the circuit, and the video information acquired by the field of view acquisition unit 1 is displayed by the smart phone, the intelligent terminal or other apparatuses.

The field of view acquisition unit 1 includes an electro-optical conversion circuit, wherein the circuit includes an electro-optical conversion board 9 which converts a field of view optical signal into an electrical signal, the electro-optical conversion board 9 is an electro-optical conversion circuit board located in the field of view acquisition unit 1, the electro-optical conversion board 9 converts the optical signal into the electrical signal, while performing automatic exposure, automatic white balance, noise reduction and sharpening operation on the signal, so that the signal quality is improved, and high-quality data is provided for imaging.

The sighting circuit processing unit 10 for connecting the electro-optical conversion board 9 with the display conversion board 11 includes a CPU core board 101 and an interface board 102, wherein the interface board 102 is connected with the CPU core board 101, particularly, the CPU core hoard 101 is connected with a serial port of the interface board 102 through a serial port, the CPU core board 101 is disposed between the interface board 102 and the electro-optical conversion board 9, the three components are placed in parallel, and board surfaces are all perpendicular to the field of view acquisition unit 1, and the electro-optical conversion board 9 transmits the converted video signal to the CPU core board 102 for further processing through a parallel data interface, and the interface board 102 communicates with the CPU core board 101 through a serial port to transmit peripheral operation information such as battery power, gesture information, time, key operation and knob operation to the CPU core board 101 for further processing.

The CPU core board 101 may be connected with a memory card through the interface board 102. In the embodiment of the present invention, with the field of view acquisition unit 1 as an observation entrance direction, a memory card slot is disposed at the left side of the CPU core board 101, the memory card is inserted in the memory card slot, information may be stored in the memory card, and the memory card may automatically upgrade a software program built in the system.

With the field of view acquisition unit 1 as the observation entrance direction, a USB interface is disposed on a side of the memory card slot on the left side of the CPU core board 101, and by means of the USB interface, the system may be powered by an external power supply or information of the CPU core board 101 is output.

The electro-optical sighting system further includes a plurality of sensors, particularly, may include several or all of an acceleration sensor, a wind speed and wind direction sensor, a geomagnetic sensor, a temperature sensor, a barometric pressure sensor, and a humidity sensor.

In particular, the sensor used by the electro-optical sighting system only includes an acceleration sensor.

A battery compartment 3 is disposed within the housing, a battery pack 31 is disposed within the battery compartment 3, an elastic sheet is disposed within the battery compartment 3 for fastening the battery pack, the battery compartment 3 is disposed in the middle in the housing, and a cover of the battery compartment may be opened by the side of the housing to realize replacement of the battery pack.

A line welding contact is disposed at the bottom side of the battery compartment 3, the contact is connected with the elastic sheet inside the battery compartment, the contact of the battery compartment 3 is welded with a wire with a wiring terminal, and is connected with the interface board 102 for powering the interface board 102, the CPU core board 101, the electro-optical conversion board 9, the display conversion board 11 and the display unit 2.

The display unit 2 is a display screen, the display unit 2 is connected with the interface board 102 through the display conversion board 11, thereby communicating with the CPU core board 101; and the CPU core board transmits display data to the display unit 2 for display.

Crossed segmenting lines displayed on the display screen and video information acquired by the field of view acquisition unit are superimposed on each other, the crossed segmenting lines are used to perform sighting shooting, and auxiliary shooting information and work instruction information which are used for assisting the shooting and transmitted by the sensors are also displayed on the display screen.

The auxiliary shooting information is partially applied to a shooting trajectory calculation, and partially used for displaying and reminding a user.

An external key is disposed at the top of the housing, and connected onto the interface board 102 through a key control board 11 on the inner side of the housing, and functions of turning the device on or off, photographing and video-recording may be realized by touching and pressing the external key.

With the field of view acquisition unit 1 as the observation entrance direction, a rotary encoder 4 with a key function is disposed on one side, which is close to the display unit 2, on the right side of the housing, and the rotary encoder 4 is linked with an encoder circuit board 41 inside the housing, and the encoder circuit board 41 is connected with an interface board through a flat cable with a wiring terminal to complete transmission of operation data. The rotary encoder controls functions such as function switching, distance magnification data adjustment, information setting and deviation data entering.

With the field of view acquisition unit 1 as the observation entrance direction, a focusing knob 5 is disposed at one side, which is close to the field of view acquisition unit 1, on the right side of the housing, and the focusing knob 5 adjusts focusing of the field of view acquisition unit 1 by a spring mechanism, so as to achieve the purpose of clearly observing an object under different distances and different magnifications.

A Picatinny 8 is disposed at the bottom of the housing and used for being fixed on a shooting instrument, and the Picatinny includes adjustable fastening nuts 81 and 82, which are located on the left side or right side of the Picatinny.

An external leather track 6 is disposed at the top of the field of view acquisition unit 1 of the housing, and the external leather track 6 and the field of view acquisition unit 1 are designed with the same optical axis and fastened by screws. The external leather track 6 is designed in a standard size and may be provided with an object fixedly provided with a standard Picatinny connector, and the object includes a laser range finder, a fill light, a laser pen, and the like.

The present invention provides an automatic target point tracing method which is applied to the above electro-optical sighting system for marking a shot target object and automatically discriminating orientation information of the currently-marked target point in a display unit area. When the marked point is not in the display unit area due to a movement, but still in a field of view unit, a location of the target point is automatically traced, and an orientation of the current target point in the display unit area is prompted, which facilitates a user to find the marked target point again; when the marked point disappears in the display unit area due to the movement and disappears in the whole field of view unit area, the automatic tracing method is still in an operation state; and once the target object enters the field of view unit, the tracing method will lock a specific orientation of the target object and performs a prompt. The method may be adapted to any environmental factor and may be used to track any target object.

The automatic target point tracing method includes marking a target point and tracing a position of the target point.

(1) Marking a Target Point.

After a target point marking command is started, data of the acquired image of the first image is subjected to matrix analysis, a corresponding pixel area in an image matrix is obtained according to a marked coordinate position, and a color value of this area is changed, so that the target point is marked.

(2) Tracing a Position of the Target Point.

From a second frame of an image sequence, feature point extraction, learning training of a classification parameter, automatic recognition of a target in a scenario, online learning, and updating of a parameter of a classifier are automatically performed according to the marked target of the first frame so that stable tracing is realized.

The method for tracing the position of the target point includes two parts of tracing the target point within the field of view and re-detecting the target point, wherein the method for tracing the target within the field of view is to trace the target point when the target object is in the field of view unit; and the method for re-detecting the target point is to re-detect and find the target point when the target object is not in the field of view unit.

1) Tracing the Target Point within the Field of View.

The method for tracing the target point within the field of view adopts an analysis method based on fast hog and color-naming and ridge regression, wherein fasthog is referred to as fhog, and color-naming is referred to cn. This method establishes a ridge regression classifier, which takes the sampled video as samples of a training regression classifier, wherein a sample with the highest score, which is traced by the image of each frame, serves as a positive sample, and other randomly sampled images serve as negative samples. The classifier has an online learning function. After the image of each frame is traced, a model parameter of the classifier is updated, and the classifier is iterated once after each tracing. In a process of tracing the target, whether the target object disappears or not is determined by a regression score, and once the target object disappears, the classifier suspends updating the model parameter, and starting the method for re-detecting the target to find the target object.

2) Re-Detecting the Target Point.

The target object disappears in the field of view due to the movement of the target object or the man-made movement of the sighting telescope; and in the above method for tracing the target point within the field of view, a reference position before the target point disappears is recorded.

With a position where the target object disappears as a reference point, a sliding window method is used to perform retrieval in the vicinity of the position where the target object disappears, classify a model, find a target with the highest score, determine whether the score of the target is higher than the set matching degree threshold, and determine that the target is a sighted target before disappearing if the scope is greater than the threshold and the target object re-enters the field of view.

The method for re-detecting the target point employs an analysis method based on fhog and cn and sliding window and ridge regression; and compared with the method for tracing the target point within the field of view, this method adds the sliding window method used during re-detection.

The method for tracing the position of the target point particularly includes the following steps:

(a) marking a position of an object of the image of the first frame;

(b) calculating a fhog feature and a cn feature for an area near a target of the previous frame and forming a feature description;

(c) sampling and training a corresponding regression classifier;

(d) regressively searching an area target to obtain a corresponding score so as to obtain a position of a target of an image of a current frame, and determining whether the target disappears or not;

(e) if the target does not disappear, extracting the fhog feature and the cn feature with the image of the current frame, and proceeding to the step (c), and otherwise, proceeding to a step (f); and (f) searching the target by using the sliding window, extracting the fhog feature and the cn feature, and finding the target by using the regression classifier trained before the target disappears.

Figure 1:
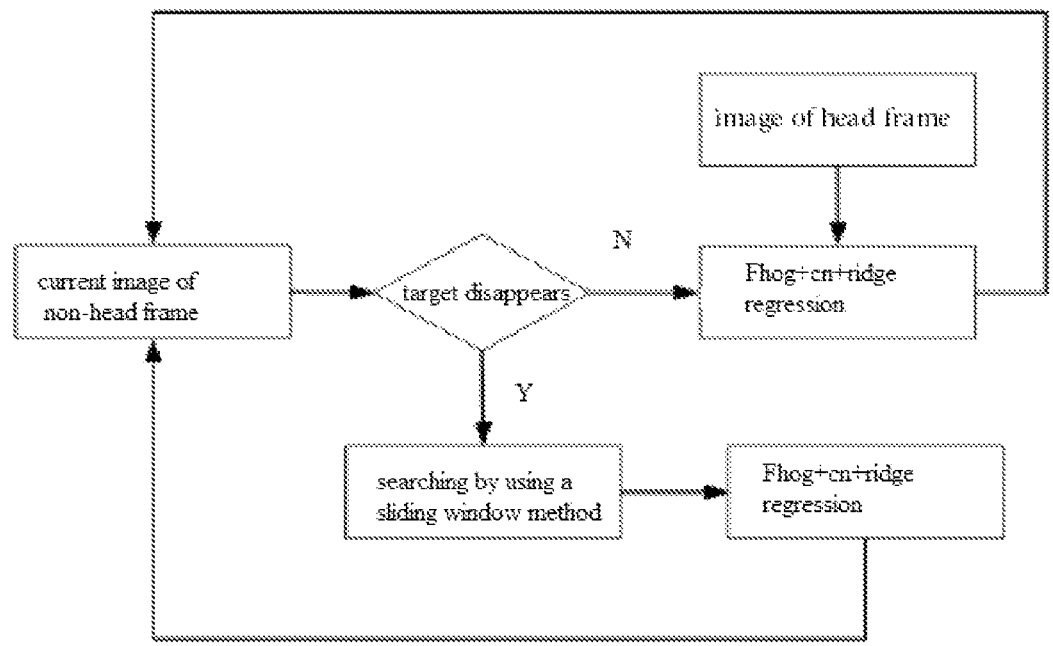
FIG. 1 is a schematic diagram of a process for tracing a position of a target point.

A process for performing the method for tracing the position of the target point is as shown in FIG. 1.

fhog Feature Point Extraction

The above method for tracing the target point within the field of view includes a fast hog (fhog) feature point detection method, which calculates gradient values of each pixel point in the image in an x direction and a y direction, and calculates a gradient direction alf(x,y) of each pixel point, its calculation formulas are as follows:

$$G_x(x, y) = H_{(x+1,y)} - H_{(x-1,y)};$$

$$G_y(x, y) = H_{(x,y+1)} - H_{(x,y-1)};$$

$$G(x, y) = \sqrt{G_x(x, y)^2 + G_y(x, y)^2};$$

$$alf(x, y) = \tan^1\left(\frac{G_y(x, y)}{G_x(x, y)}\right);$$

wherein $G_x(x,y)$ represents a gradient value of a pixel point at a coordinate (x,y) in the x direction; $G_y(x,y)$ represents a gradient value of a pixel point at the coordinate (x,y) in the y direction; G(x,y) represents a gradient value of the pixel point at the coordinate (x,y); alf(x,y) represents a gradient direction of the pixel point at the coordinates (x,y); $H_{(x-1,y)}$ represents a luminance H value of a pixel point at a coordinate (x−1,y); and Gradient magnitudes are respectively calculated on three channels R, G and B of the image, by taking the gradient direction on the channel with the greatest gradient magnitude in combination with unsigned gradients (0 to 180) and signed gradients (0 to 360), the unsigned gradients (0 to 180) are divided into 9 segments, every 20 degrees represents a statistical segment; and the signed gradients (0 to 360) are divided into 18 segments, each 20 degrees represents a statistical segment; the image is segmented into n units by using every 4*4 pixels as one unit, wherein n is a positive integer; signed and unsigned gradient directions within each 4*4 unit are counted to obtain a gradient direction histogram D of the unit, and D is a vector with 9+18=27 dimensions.

The gradient direction histogram D is normalized after being obtained, its method is to normalize an area consisting a current unit $D_{(i,j)}$ and other three units around it, wherein there are four cases for the current unit $D_{(i,j)}$ and the other three units around it, accordingly, $D_{(i,j)}$ is normalized to obtain four normalized data $I1_{(i,j)}$、$I2_{(i,j)}$、$I3_{(i,j)}$、$I4_{(i,j)}$ as follows:

$$I1_{(i,j)} = \sqrt{D_{(i,j)}^2 + D_{(i,j+1)}^2 + D_{(i+1,j)}^2 + D_{(i+1,j+1)}^2};$$

$$I2_{(i,j)} = \sqrt{D_{(i,j)}^2 + D_{(i,j+1)}^2 + D_{(i-1,j)}^2 + D_{(i-1,j+1)}^2};$$

$$I3_{(i,j)} = \sqrt{D_{(i,j)}^2 + D_{(i,j-1)}^2 + D_{(i+1,j)}^2 + D_{(i+1,j-1)}^2};$$

$$I4_{(i,j)} = \sqrt{D_{(i,j)}^2 + D_{(i,j-1)}^2 + D_{(i-1,j)}^2 + D_{(i-1,j-1)}^2};$$

a new feature gradient after each unit is normalized is as follows:

$$N_{1(i,j)} = D_{(i,j)}/I1_{(i,j)};$$

$$N_{2(i,j)} = D_{(i,j)}/I2_{(i,j)};$$

$$N_{3(i,j)} = D_{(i,j)}/I3_{(i,j)};$$

$$N_{4(i,j)} = D_{(i,j)}/I4_{(i,j)};$$

The newly-calculated four gradient features $N_{1(i,j)}$、$N_{2(i,j)}$、$N_{3(i,j)}$、$N_{4(i,j)}$ are concatenated together to obtain a new feature expression of each unit, and each unit eventually obtains a vector V with 4*27=108 dimensions. After the new feature vector is obtained, due to overhigh dimension, the new feature vector is reduced to a 31-dimensional vector by using a principal component dimension reduction method. As can be seen from the above expression, the image has n units, so that the finally obtained feature dimension is n*31.

Color-Naming Feature Extraction

Color-naming feature extraction is color attribute-based feature extraction, and is combined with fhog gradient-based feature extraction, so that the detection accuracy of the target is improved. Firstly, according to a size of a matrix of a fhog feature, for example, the size of a fhog feature matrix is H*W*31, an area of a feature to be extracted is scaled to H*W, a resize operation is performed on the image to obtain each pixel in the resized image, an index of the feature point in the feature matrix is calculated according to a calculation method of its RGB value and a color feature, RR, GG and BB respectively represent a RGB value of each pixel point, and Index serves as the index, and a calculation method is as follows:

$$Index = \frac{RR*32*32}{8} + \frac{GG*32}{8} + \frac{BB}{8};$$

The obtained index value corresponds to an index number in a color feature matrix, the size of the color feature matrix is set to 20768*10, a 10-dimensional feature in the matrix is extracted by the Index, and the extracted color feature is listed after the fhog feature. In this way, a 41-dimensional feature is obtained by the fhog feature extraction and the cn feature extraction, and the corresponding training detection is performed finally through a correlation convolutional filtering algorithm.

Ridge Regression Analysis

After the image is subjected to the fhog feature extraction and the cn feature extraction, a ridge regression analysis method is used to train the classifier. The ridge regression analysis method is to construct a training sample of the classifier by cyclic shifting, so that the data matrix becomes a cyclic matrix and then a problem is transformed to a Fourier domain based on a property of the cyclic matrix, and a model parameter is calculated at the Fourier domain.

The above ridge regression analysis method mainly includes the following steps:

Linear Regression a linear regression function of a training set (xi,yi) of the classifier is f(x)=wT x, wherein is set as a regular term coefficient preventing model fitting from overflowing, and by means of a training method, $$\min_w \sum_i (f(x_i) - y_i))^2 + \lambda \|w\|^2;$$

a least squared method solution of linear regression may be solved:

$$w = (X^H X + \lambda I)^{-1} X^H y;$$

wherein $X^H - (X^*)^T$ is a conjugate transpose of x. A vector of n*1 is set, $X = [x_n, x_1, x_2, \ldots, x_{n-1}]^T$ represents a sample, a cyclic coefficient P of the sample X is set, $$\Gamma = \begin{bmatrix} 0 & 0 & 0 & \ldots & 1 \\ 1 & 0 & 0 & \ldots & 0 \\ 0 & 1 & 0 & \ldots & 0 \\ \vdots & \vdots & \ddots & \ddots & \vdots \\ 0 & 0 & \ldots & 1 & 0 \end{bmatrix};$$

wherein $PX - [x_n, x_1, x_2, \ldots, x_{n-1}]^T$ makes x move one element in a vertical direction. $P^u X$ makes x move u elements in the vertical direction, a case where u takes minus refers to a movement in an opposite direction. An image boundary directly obtained by cycle is not smoothly processed, and it is necessary to eliminate such a non-smooth phenomenon by a method of multiplying a Basesample image by a Hamming window to reduce a weight of the image.

According to the property of the cycle, all shift signal sets are represented as follows:

$$\{P^u X | u=0,\ldots n-1\};$$

then a cyclic movement of the sample can be represented as a matrix:

$$X1 = C(x) = \begin{bmatrix} X_1 & X_2 & X_3 & \ldots & X_n \\ X_n & X_1 & X_2 & \ldots & X_{n-1} \\ X_{n-1} & X_n & X_1 & \ldots & X_{n-2} \\ \vdots & \vdots & \vdots & \ddots & \vdots \\ X_2 & X_3 & X_4 & \ldots & X_1 \end{bmatrix};$$

the cyclic matrix is transformed by discrete Fourier transform (DFT) to realize diagonalization in a Fourier space, $$X1 = F \text{diag}(\hat{x}) F^H;$$

in the above formula, F represents a discrete Fourier matrix and is a constant, and the DFT is a linear operation, $\hat{x}=\mathcal{F}(x)$ represents a diagonal matrix subjected to the DFT.

$$\mathcal{F}(z)=\sqrt{n}Fz;$$

Acceleration of Linear Regression Training a formula $$X1 = F\text{diag}(\hat{x})F^H;$$

will be substituted into a ridge regression formula $$w=(X1^H X1+\lambda I)^{-1} X1^H y;$$

it can be concluded that $$X1^H X1 = F\text{diag}(\hat{x}^*) F^H F \text{diag}(\hat{x}) F^H;$$

a property of a unitary matrix is utilized $$F^H F = I;$$

it can be concluded that $$X1^H X1 = F\text{diag}(\hat{x}^*)\text{diag}(\hat{x})F^H;$$

a multiplication of multiple elements is defined as a centered dot symbol ⊙, it can be concluded that:

$$X1^H X1 = F\text{diag}(\hat{x}^* \odot \hat{x})F^H;$$

$$w=(F\text{diag}(\hat{x}\odot\hat{x}^*)F^H+\lambda FIF^H)^{-1} F\text{diag}(\hat{x}^*)F^H y;$$

the above formula is equivalent to:

$$w=(F\text{diag}(\hat{x}\odot\hat{x}^*+\lambda)F^H)^{-1} F\text{diag}(\hat{x}^*)F^H y;$$

it may be yielded by using an inversion property of the cyclic matrix:

$$w = F\text{diag}\left(\frac{1}{\hat{x}\odot\hat{x}^*+\lambda}\right)F^H F\text{diag}(\hat{x}^*)F^H y;$$

the above formula is equivalent to:

$$w = F\text{diag}\left(\frac{\hat{x}^*}{\hat{x}\odot\hat{x}^*+\lambda}\right)F^H y;$$

the diagonalization is transposed by using the matrix:

$$F\text{diag}(x)F^H = C(\mathcal{F}^{-1}(x));$$

then $$w = C\left(\mathcal{F}^{-1}\left(\frac{\hat{x}^*}{\hat{x}\odot\hat{x}^*+\lambda}\right)\right) y;$$

from $$\mathcal{F}(C(x)\cdot y)=\hat{x}^* \odot \hat{y};$$

it can be concluded that:

$$\mathcal{F}(w) = \left(\frac{\hat{x}^*}{\hat{x}\odot\hat{x}^*+\lambda}\right)^* \odot \mathcal{F}(y);$$

the above formula is equivalent to:

$$\mathcal{F}(w) = \left(\frac{\hat{x}}{\hat{x}\odot\hat{x}^*+\lambda}\right) \odot \mathcal{F}(y);$$

the above formula is equivalent to:

$$\mathcal{F}(w) = \left(\frac{\hat{x}\odot\hat{y}}{\hat{x}\odot\hat{x}^*+\lambda}\right);$$

it can be concluded that:

$$\hat{w} = \frac{\hat{x}\odot\hat{y}}{\hat{x}\odot\hat{x}^*+\lambda};$$

Kernel Method-Based Regression Training

In order to improve the regression training accuracy, a kernel method-based regression training method is used to solve an accuracy problem. The method converts linear conversion into non-linear processing and performs conversion by the following formula:

$$w=\Sigma_i \alpha_i \varphi(x);$$

means that a feature is mapped into a high-dimensional space by a mapping function $\varphi(x)$, let:

$$\varphi^T(x)\varphi(x')=k(x,x');$$

$k(x,x')$ is stored in a matrix K, and K represents a kernel correlation matrix of all training samples, set:

$$K_{ij}=k(x_i,x_j);$$

in order to improve the accuracy, an objective function is optimized as follows:

$$\min_\alpha \|\varphi^T(X)\varphi(X)\alpha - y\|^2 + \lambda\|\varphi^T(X)\alpha\|^2;$$

from the above linear regression formula, a kernel method-based nonlinear regression method may be obtained as follows:

$$f(z)=w^T z;$$

the above formula is equivalent to:

$$f(z) = \sum_{i=1}^{n} \alpha_i k(z, x_i)$$

a solution of nuclear space ridge regression may be obtained as follows:

$$\alpha=(K+\lambda I)^{-1} y;$$

it may be known from the above setting and derivation, K represents the kernel correlation matrix of all the training samples. If a kernel function is chosen properly such that a change in an order of elements inside x does not affect the value of the function, it is guaranteed that the kernel matrix K is a cyclic matrix as well.

A radial basis kernel meets a condition of the cyclic matrix, so that a derivation formula is obtained as follows:

$$\alpha=(F\text{diag}(\hat{k}^{xx})F^H+\lambda FIF^H)^{-1}y;$$

the above formula is equivalent to:

$$\alpha=(F\text{diag}(\hat{k}^{xx}+\Delta)F^H)^{-1}y;$$

the above formula is equivalent to:

$$\alpha = F\text{diag}\left(\frac{1}{\hat{k}^{xx}+\lambda}\right)F^H y;$$

the above formula is equivalent to:

$$\alpha = C\left(\mathcal{F}^{-1}\left(\frac{1}{\hat{k}^{xx}+\lambda}\right)\right)y;$$

a convolution property of the cyclic matrix is applied:

$$\mathcal{F}(C(x)\cdot y)=\hat{x}^*\odot\hat{y};$$

by performing the DET on left and right sides simultaneously, it may be derived that:

$$\hat{\alpha}=\left(\frac{1}{\hat{k}^{xx}+\lambda}\right)^*\odot\hat{y};$$

wherein $k^{xx}$ represents a first row of the kernel correlation matrix, and elements in a $k^{xx}$ vector are set as follows:

$$k_i^{xx\prime}=k(x'P^{i-1}x);$$

when calculating the Gaussian kernel correlation, the above formula is equivalent to:

$$k_i^{xx\prime}=h(\|x',P^{i-1}x\|^2);$$

the above formula is equivalent to:

$$k_i^{xx\prime}=h(\|x\|^2+\|x'\|^2-2x'^T P^{i-1}x);$$

a property of cyclic convolution is applied:

$$\mathcal{F}(C(x)\cdot y)=\hat{x}^*\odot\hat{y};$$

$$C(x)\cdot y=\mathcal{F}^{-1}(\hat{x}^*\odot\hat{y});$$

it can be concluded that:

$$k^{xx\prime}=h(\|x\|^2+\|x'\|^2-2\mathcal{F}^{-1}(\hat{x}^*\odot\hat{x}'));$$

the above formula is equivalent to:

$$k^{xx\prime}=\exp\left(-\frac{1}{\sigma^2}\left(\|x\|^2+\|x'\|^2-2\mathcal{F}^{-1}(\hat{x}^*\odot\hat{x}')\right)\right);$$

which represents a size of a kernel correlation of a base sample and a sample having an offset i from it.

Kernel Method-Based Regression Detection

The core correlation matrix of all training samples and samples to be tested is:

$$K^z=C(k^{xz});$$

wherein $k^{xz}$ represents the nuclear correlation of x and z. Accordingly, it may be concluded that:

$$f(z)=K^z\alpha;$$

the above formula is equivalent to:

$$f(z)=C(K^z)\alpha;$$

the above formula is equivalent to:

$$f(z)=C(\mathcal{F}^{-1}(\hat{k}^{xz}))\alpha;$$

it is derived that:

$$\mathcal{F}(f(z))=(\hat{f}^{xz})^*\odot\hat{\alpha};$$

the above formula is equivalent to:

$$\mathcal{F}(f(z))=\hat{k}^{xz}\odot\hat{\alpha};$$

a derivation result is obtained:

$$\hat{f}(z)=\hat{k}^{xz}\odot\hat{\alpha}.$$

Determination of the State of the Target

By using a regression score regressively calculated by the trained ridge regression model in a search area, the target area is searched, the regression score of each sample is calculated, and whether the target is found is determined through the following two conditions:

(a) The first condition: the highest score of all the samples in the current search area is found, the highest score is compared with the set judgment threshold, the judgment threshold is set as threshold_1, and the highest score is $F_{max}$.

$$F_{max}=\max F_{(s,w)}$$

wherein w is a trained model, and s represents a sample sampled near the target. If the highest score $F_{max}$ is greater than threshold_1, then it is met.

(b) The second condition: scores of all the sampled samples of the current search area are calculated, a peak correlation energy of the area is calculated, this indicator reflects the oscillation severity of the highest score relative to the other sample scores in the search area, and the judgment threshold is set as threshold_2, and its specific calculation method is as follows:

$$d=\frac{|F_{max}-F_{min}|}{\text{mean}\left(\sum_{(w,h)}(F_{w,h}-F_{min})^2\right)};$$

wherein $F_{max}$ represents the highest score, $F_{min}$ represents the lowest score; and $F_{w,h}$ represents scores of samples numbered as w and h, and mean represents averaging a numeral value within brackets.

If the calculated peak correlation energy d is greater than threshold_2, then it is met.

Figure 2:
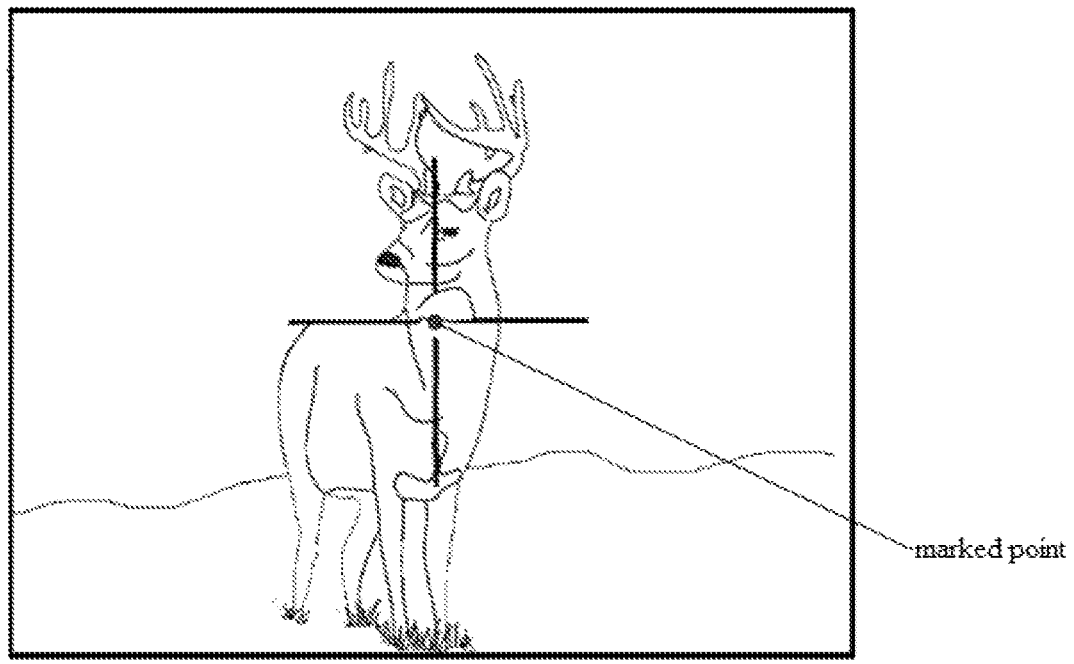
FIG. 2 is a schematic diagram of a marking effect of an embodiment 1 according to the present invention.

(c) If both of the above conditions are met, it is possible to determine that the target is found.

the above method for making the target point is used to obtain an effect as shown in FIG. 2, a current coordinate is obtained with a crossed segmenting center as a reference point, a circle with a radius r is marked at a coordinate point, and the circle serves as a target point to be shot for being prompted and shown.

Figure 3:
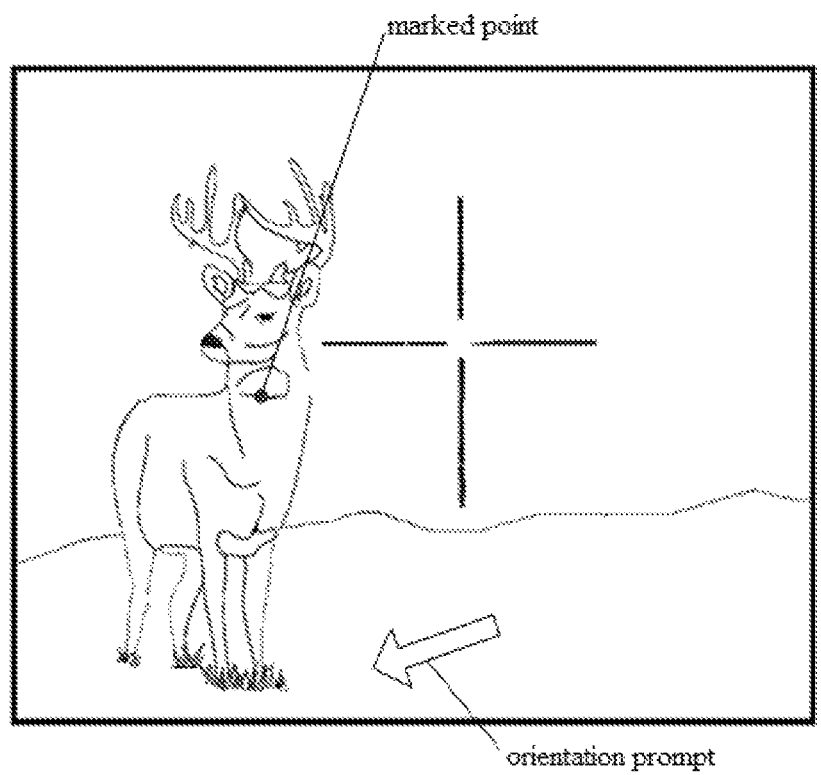
FIG. 3 is a schematic diagram of prompting an orientation of a target point within a display unit in an embodiment 1 according to the present invention.

When an unknown deviation of the target object or the sight occurs, the above method for tracing the target point within the field of view is used to ensure that a position of the marked target point on the target object is unchanged, as shown in FIG. 3, at this time, the target point is in the lower-left of the crossed segmenting center, while a specific direction of the target point in the crossed segmenting center is prompted on the screen, as shown by an orientation in FIG. 3; if the target point and the crossed segmenting center occur in the same screen, a user may easily know a specific location of the target point; and if the target point is in the field of view, but not in the screen, then at this time, the user may rapidly find the target point according to an orientation prompt.

Figure 4:
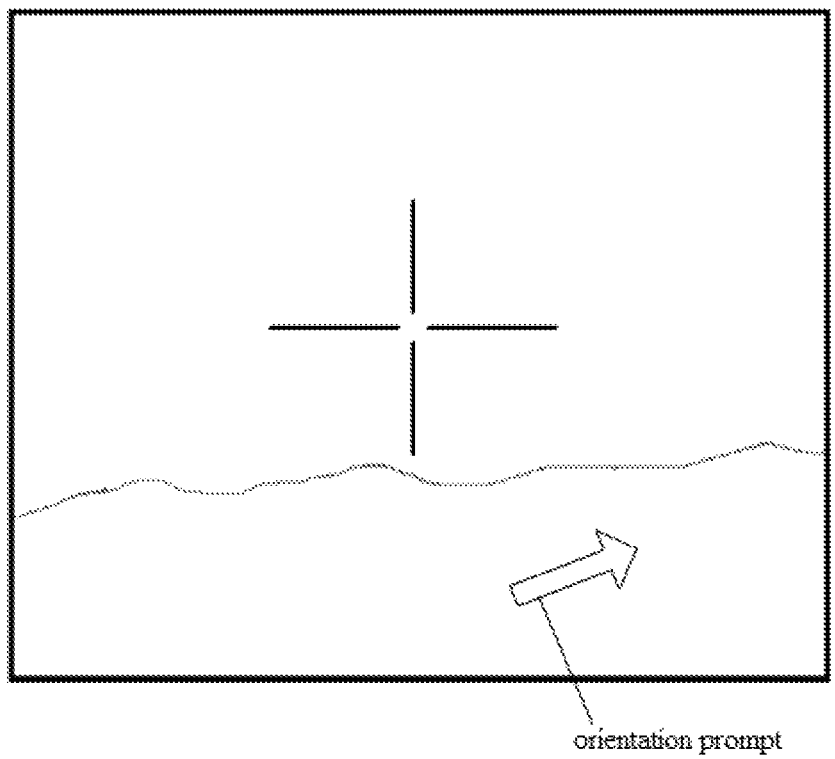
FIG. 4 is a schematic diagram of prompting an orientation of a target point outside a display unit in an embodiment 1 according to the present invention.

When the target point disappears in the field of view, the above method for re-detecting the target point is used to search the target. When the target enters the field of view, the method for re-detecting the target point may automatically lock the target; at this time, if the target point is at an edge of the field of view and the target point and the crossed segmenting center are not simultaneously displayed in the screen, then as shown in FIG. 4, the system prompts the target object of a direction in the crossed segmenting center; and at this time, if the target point is in the field of view and the target point and the crossed segmenting center are simultaneously displayed in the screen, then the system prompts the target object as shown in FIG. 4.

Embodiment 2

Figure 8:
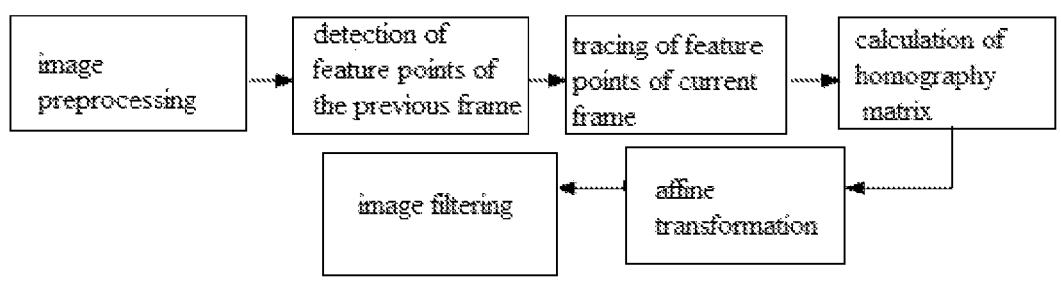
FIG. 8 is a schematic diagram of a process of a video anti-jitter method in an embodiment 2 according to the present invention.

This embodiment is basically the same as the embodiment 1 except that in order to improve the display quality of video, the electro-optical sighting system of the embodiment is additionally provide with a video anti-jitter processing unit on a CPU core board, a video anti-jitter processing method included by the video anti-jitter processing unit performs pre-processing, feature point detection, feature point tracing, homography matrix calculation, image filtering and affine transformation on the acquired image data, and the image subjected to a series of processing can be displayed smoothly. A flow diagram of the video anti-jitter processing method is as shown in FIG. 8.

The video anti-jitter processing method includes detection of feature points of the previous frame, tracing of feature points of a current frame, homography matrix calculation, image filtering and affine transformation; the detection of feature points of the previous frame uses extraction of the feature points by using a FAST corner detection method as a template of performing feature point tracing by the data of the following frame, the current frame employs a pyramid Lucas-Kanade optical flow method for performing feature point tracing on the previous frame, two feature points with excellent properties are selected from all feature points by using a RANSAC algorithm, it is assumed that the feature points only have rotation and translation, the affine transformation of a homography matrix is rigid body transformation, and a translation distance and a rotation angle are calculated from two sets of points to calculate the homography matrix of the affine transformation, subsequently, a Kalman filter is used to perform a filtering operation on a transformation matrix, so as to eliminate random motion components; and finally coordinates of the original image and the filtered transformation matrix are multiplied so that coordinates of the original coordinates in a new image may be obtained, so that the affine transformation is achieved and the video jitter is eliminated.

In addition, for non-RGB formats of images acquired by some models of sights, there is a need for performing a preprocessing operation on image information to convert it into a RGB format before the feature point of the previous frame is detected, so that the image information is simplified, and then provided to the subsequent image processing module.

What is claimed is:

1. An automatic target point tracing method for an electro-optical sighting system, comprising:
   acquiring a first frame of image and a plurality of frames of image that follow the first frame of image using the electro-optical sighting system;
   marking a target point in first frame of image, wherein marking a target point in the first frame of image comprises the steps of:
      performing matrix analysis on data of a first image in the first frame;
      retrieving a corresponding pixel area in an image matrix according to a coordinate position of a center of crossed segmenting lines of the electro-optical sighting system; and
      changing a color value of the pixel area;
   tracing a position of the target point in each of the plurality of frames of image, wherein tracing the position of the target point comprises: tracing the target point within a field of view, which comprises the sub-steps of:
      performing feature extraction and feature description on the first image of the target point;
      establishing a ridge regression classifier and performing learning training on the classifier according to the extracted feature;
      calculating a regression score of the feature of a real-time acquired image in the trained ridge regression classifier;
      determining that the target point is automatically recognized when the regression score reaches a requirement; and
      displaying an orientation of the target point in a display unit area,
   and re-detecting the target point which is not in the field of view unit, which comprises the sub-steps of:
      determining that the target point disappears when the regression score does not reach the requirement;
      and searching the target point by performing regression score calculation until the regression score reaches the requirement using the position where the target point disappears as a reference point through a sliding window method.

2. The automatic target point tracing method according to claim 1, wherein feature extraction and feature description on the image of the target point is performed using a color-naming feature point detection method,
   which comprises:
   converting a RGB space of the image into a color attribute space, wherein the color attribute space is a 11-dimensional color representation.

3. The automatic target point tracing method according to claim 1, wherein establishing the ridge regression classifier and performing learning training on the classifier according to the extracted feature comprises:
   constructing a training sample of the classifier from the extracted feature by cyclic shifting so that a data matrix becomes a cyclic matrix; then
   transforming to a Fourier domain based on a property of the cyclic matrix to obtain a basic sample, wherein a label size of the basic sample obeys Gaussian distribution; and
   training the ridge regression classifier by using the training sample to obtain a model parameter of the regression classifier.

4. The automatic target point tracing method according to claim 3, wherein wherein the cyclic matrix is as follows:

$$X = C(x) = \begin{bmatrix} X_1 & X_2 & X_3 & \dots & X_n \\ X_n & X_1 & X_2 & \dots & X_{n\,1} \\ X_{n-1} & X_n & X_1 & \dots & X_{n-2} \\ \vdots & \vdots & \vdots & \ddots & \vdots \\ X_2 & X_3 & X_4 & \dots & X_1 \end{bmatrix};$$

wherein $x_i$ represents an extracted feature value, $i \in (1,n)$;

wherein transforming to a Fourier domain comprises: performing a discrete Fourier transform on the cyclic matrix, and diagonalizing in a Fourier space to obtain $X=F\text{diag}(\hat{x})F^H$, wherein F represents a discrete Fourier matrix and is a constant; $\hat{x}=\mathcal{F}(x)$ represents a diagonal matrix subjected to the discrete Fourier transform, and wherein the training sample is the diagonalized matrix.

5. The automatic target point tracing method according to claim 1, wherein calculating the regression score of the feature of the real-time acquired image in the trained ridge regression classifier is performed according to the following equation:

$$\hat{f}(z) = \hat{k}^{xz} \odot \hat{\alpha}; \hat{\alpha} = \left(\frac{1}{\hat{k}^{xx}+\lambda}\right)^* \odot \hat{y};$$

wherein (x, y) represents a training set of the ridge regression classifier, and $\hat{k}^{xx}$ represents a first row of a kernel correlation matrix, $\lambda$ represents a regular term coefficient for preventing model fitting from overflowing;

Z represents a feature sample of the real-time acquired image, $\hat{k}^{xz}$ represents a kernel correlation of a sample Z after being shifted on the basis of a sample X, and $\odot$ is a centered dot symbol representing a multiplication of multiple elements.

6. The automatic target point tracing method according to claim 1, wherein the regression score reaches the requirement when $F_{max > threshold\_1}; d_{>threshold\_2}$, wherein $$F_{max = max} F_{(s,w)}; d = \frac{|F_{max} - F_{min}|}{\text{mean}\left(\sum_{(w,h)} (F_{w,h} - F_{min})^2\right)};$$

$F_{max}$ represents a highest score of all samples in a current search area, $F_{min}$ represents a lowest score of all samples in the current search area, $F_{w,h}$ represents scores of samples numbered as w and h, mean represents averaging a numerical value within brackets, w represents a trained model, s represents a sample sampled near a target point, and threshold_1 and threshold_2 represent judgment thresholds.

7. The automatic target point tracing method according to claim 1, wherein the electro-optical sighting system comprises a housing defining an accommodating space, an interior portion of the accommodating space comprises a field of view acquisition unit, a video processing unit, a display unit, a power supply, and a sighting circuit unit; and an automatic target point tracing module, wherein the automatic target point tracing module is configured to automatically trace a target object by employing the automatic target point tracing method of claim 1.

8. The automatic target point tracing method according to claim 7, wherein the electro-optical sighting system comprises an anti-jitter processing unit, wherein the anti jitter processing unit performs anti jitter processing on an image acquired by the electro-optical sighting system and then the image subjected to the anti-jitter processing is displayed at the display unit.

* * * * *